2,822,305

PROCESS FOR FRACTIONATING STARCH INTO COMPONENTS WITH BRANCHED AND LINEAR CHAINS

Willem C. Bus, The Hague, Johannes Muetgeert, Rotterdam, and Pieter Hiemstra, Veendam, Netherlands, assignors to Cooperatieve Verkoop- en Productievereniging van Aardappelmeel en Derivaten "Avebe" G. A., Veendam, Netherlands, a corporation of the Netherlands No Drawing. Application June 7, 1954
Serial No. 435,052

Claims priority, application Netherlands June 10, 1953

4 Claims. (Cl. 127—71)

This is a continuation-in-part of our U. S. Patent application Serial No. 325,698, filed on December 12, 1952, relating to a process for fractionating starch into components with linear chains (amylose) and branched chains (amylopectin) according to which the starch is dissolved in an aqueous solution of at least one salt of the class consisting of magnesium sulphate, ammonium sulphate and sodium sulphate or of a mixture of two or three of these salts at elevated temperature and this solution is slowly cooled down. The amylose precipitates on cooling and is separated from the mother liquor e. g. by means of a centrifuge; on further cooling the amylopectin precipitates, which can also easily be separated from the mother liquor.

In order to prevent the amylopectin from precipitating during the centrifugation of the amylose the temperature of the liquid during the centrifugation must be kept constant rather accurately, which causes difficulties in actual practice if this temperature is considerably higher than the room temperature. However, if the temperature decreases during the separation of amylose and mother liquor, part of the amylopectin is precipitated, which is separated with the amylose.

This difficulty can be obviated by working with a less concentrated salt solution, as a result of which the amylose only precipitates at room temperature and the amylopectin precipitates by cooling to temperatures of 0–10° C.; however, the cooling of relatively large quantities of liquids involves considerable expenses.

According to the process described in the co-pending application No. 429,104 these drawbacks are obviated by choosing such a concentration of the salt in the solution that amylose precipitates at room temperature without amylopectin precipitating. After the amylose and the mother liquor have been separated the salt concentration of the mother liquor has to be increased so far that the amylopectin precipitates without further cooling.

It has been found that all those difficulties could also be prevented by dissolving starch in a concentrated salt solution and cooling this starch solution in such a way that both the amylose and the amylopectin precipitate, separating the precipitate of amylose and amylopectin formed from the mother liquor and subsequently mixing this precipitate with water and the amylopectin being dissolved, the amylose remaining in suspension, after which the amylose is separated from the solution. Sometimes solution of the amylopectin is effected by heating the mixture of the precipitate and water. After removal of the amylose the amylopectin can later on be precipitated by increasing the salt concentration by addition of salt or by partly evaporating the water.

Good results are obtained by dissolving starch at temperatures of 120–160° C. in solutions containing 25–30 g. $MgSO_4 \cdot 7$ aq. per 100 cc., and cooling the starch solution to 20–25° C. After settling the precipitate is separated from the solution, subsequently introduced in water, the amylopectin is dissolved by heating to 60–80° C. whilst stirring continuously and the remaining amylose suspension is separated in a centrifuge with a gravitational field of 1,000–30,000 g.

On dissolving the starch in magnesium sulphate solutions at temperatures above 120° C. it has furthermore proved to be useful to add a reducing substance which is stable at this temperature in an aqueous medium. As described in the U. S. A. patent application No. 325,698, when the starch is dissolved in salt solutions at temperatures exceeding 120° C., some darkening of the starch takes place. It was though that by carrying out the process in an atmosphere of nitrogen, the darkening would be avoided. Some improvement was obtained, but the result was not completely satisfactory. In addition, the working costs are considerably higher than when the process is carried out in the presence of air.

It has been found that by adding reducing agents which are themselves stable in aqueous solution at the chosen dissolving temperature of the starch, the darkening which occurred can be nearly entirely prevented. The reducing agent is effective when used in a quantity considerably smaller than that which conforms with the quantity of oxygen present in the liquid and in the autoclave.

Suitable reducing agents for use in this manner include sodium sulfite and sodium thiosulfate. A 0.006% sodium sulfite concentration in the liquid was found to be sufficient to prevent darkening in a magnesium sulfate solution of starch having a quantity of oxygen in the system sufficient to bind 0.05% sodium sulfite.

The prevention of color formation is especially important where the starch fractionation process is conducted in a cycle and the mother lye from which the starch has been separated is employed in dissolving a new quantity of starch. The reducing agent is also effective where aqueous solutions of sodium sulfate and ammonium sulfate are used as the fractionating liquid. It should be noted, however, that ammonium sulfate causes much more darkening than magnesium sulfate. Although the discoloration which occurs with ammonium sulfate cannot be entirely prevented, it is substantially reduced by this method.

It has also been found possible either to replace the magnesium sulphate entirely or partly by other salts such as sodium sulphate or ammonium sulphate, as also described in the U. S. A. patent application No. 325,698. In the parent application, the magnesium sulfate, sodium sulfate, ammonium sulfate, or suitable mixtures thereof, are present in the aqueous fractionating solutions in a concentration of more than 5% and may be as much as 30% by weight of the anhydrous salt. It is preferred, according to this invention, to use 10–30% of salt on the same basis. If the salt concentration is less than 5% by weight of the anhydrous salt, the amylose and amylopectin are very difficult to separate by precipitation.

Several types of starch may be used in the process of this invention, including corn starch, wheat starch, potato starch, tapioca starch and pea starch. Sometimes it is preferred to defat the starch before dissolving it in the fractionating solution. Potato starch has the advantage that no defatting is necessary. Very good results were obtained with 3–8% starch dissolved in an aqueous magnesium sulfate solution having a concentration of 20–30 grams magnesium sulfate per 100 cc. of solution. Good results were also obtained with concentrated solutions of ammonium sulfate, sodium sulfate, and mixtures of these three salts. It has been found possible to work with starch solutions having up to 20% by weight of starch, thus providing a substantial reduction in processing costs. If starch concentrations of more than 8%, as for example 15%, are employed, the salt concentration of the solution may be lower than with a starch concentration of 8% or less.

*Example*

50 g. potato starch with a moisture content of 20% were dissolved or suspended in 800 cc. water with 224 g. $MgSO_4 \cdot 7$ aq. and 1.2 g. $Na_2SO_3 \cdot 7$ aq. Dissolving of the starch was effected by heating in an autoclave at 160° C. for 10 minutes. On cooling to 25° C. amylose and amylopectin precipitated. The precipitate was separated from the liquid after a precipitation time of 10 minutes and introduced in water to a total volume of approx. 1,000 cc. Whilst stirring continuously, the mixture was heated to 70° C., by which the amylopectin was dissolved. By centrifuging with 8,000 revolutions per minute in a centrifuge 40 cm. in diameter the amylose was separated. The yield of amylose was 85% and the purity 100%. The amylopectin was precipitated from the remaining solution by the addition of magnesium sulphate to a concentration of 28 g. $MgSO_4 \cdot 7$ aq. per 100 cc.

We claim:

1. A process for fractionating starch into components with branched and linear chains comprising dissolving between about 3% and about 20% of starch in an aqueous solution containing 10% to 30% of a compound selected from the group consisting of magnesium sulfate, sodium sulfate, ammonium sulfate, and mixtures thereof, by heating at an elevated temperature under superatmospheric pressure, cooling the solution to a temperature sufficiently low to precipitate amylose and amylopectin, separating the precipitate from the mother liquor, mixing the precipitate with water to dissolve amylopectin, separating the undissolved amylose from the amylopectin solution, and precipitating the amylopectin from the solution by adding a salt of said group to the solution.

2. Process according to claim 1, characterized in that the precipitate of amylose and amylopectin is heated to facilitate dissolving of the amylopectin in water.

3. Process for fractionating starch according to claim 1 in which said aqueous solution contains 25–30 g. $MgSO_4 \cdot 7H_2O$ per 100 cc., and the process comprises cooling the starch solution to 20–25° C. to precipitate amylose and amylopectin, separating the precipitate from the solution and mixing the precipitate in water, dissolving the amylopectin by heating the aqueous mixture to 60–80° C., separating the undissolved amylose from the solution of amylopectin in water, precipitating the amylopectin by increasing the salt concentration of the solution to a value of between 25–30 g. $MgSO_4 \cdot 7H_2O$ per 100 cc. of solution and separating the amylopectin from the solution.

4. A process for fractionating starch into components with branched and linear chains comprising dissolving between about 3% and about 8% of starch in an aqueous solution containing 10% to 30% of a compound selected from the group consisting of magnesium sulfate, sodium sulfate, ammonium sulfate, and mixtures thereof, by heating at an elevated temperature under superatmospheric pressure, cooling the solution to a tempearture sufficiently low to precipitate amylose and amylopectin, separating the precipitate from the mother liquor, mixing the precipitate with water to dissolve amylopetcin, separating the undissolved amylose from the amylopectin solution, and precipitating the amylopectin from the solution by adding a salt of said group to the solution.

References Cited in the file of this patent

UNITED STATES PATENTS

| 2,014,799 | Fuller | Sept. 17, 1935 |
| 2,515,095 | Schoch | July 11, 1950 |
| 2,515,096 | Schoch | July 11, 1950 |

FOREIGN PATENTS

| 5,844 | Great Britain | of 1896 |
| 590,750 | Great Britain | July 28, 1947 |

OTHER REFERENCES

J. Textile Institute, January 1948, p. A–60.